May 21, 1940.  R. A. SHIELDS  2,201,800
CAR BUMPER
Filed May 21, 1937   5 Sheets-Sheet 5

INVENTOR
Robert A. Shields
BY
ATTORNEY

Patented May 21, 1940

2,201,800

UNITED STATES PATENT OFFICE 2,201,800

CAR BUMPER

Robert A. Shields, Berwick, Pa., assignor to American Car and Foundry Company, New York, N. Y., a corporation of New Jersey Application May 21, 1937, Serial No. 143,891

17 Claims. (Cl. 213—9)

This invention relates to improvements in bumper and coupling units in general and in particular to such arrangements for use on mine or other industrial cars. In the past bumpers and couplers have been constructed which are elastically connected to the car by means of a non-metallic cushioning element, but in the majority of cases the connection has been by means of non-metallic material acting in compression or tension. A few constructions have been proposed in which a non-metallic material will act in shear to resist the bumping and draft forces but in all of these it has been impossible to secure sufficient shearing area to permit of the application to large capacity cars. In these proposed constructions the non-metallic unit has been designed to fit the special application and would necessitate the carrying of large stocks of spare parts of varying sizes and capacities.

It is an object, therefore, of this invention to provide a combined coupling and buffing element with non-metallic material acting in shear to resist the bumping and coupling strains and in which the non-metallic units may be of standard construction regardless of the ultimate capacity of the assembly.

It is a further object of the invention to provide a combined bumping and coupling element using non-metallic shock absorbing material in which the capacity of the element may be varied merely by varying the number of non-metallic units used.

A still further object of the invention is the provision of a car bumper and coupling element using non-metallic shock absorbing material which may be easily assembled or dissembled for repair.

Another object of the invention is the provision of a combined bumping and coupling assembly in which non-metallic shock absorbing units acting in shear are used, so arranged as to move relative to each other, thus causing friction to assist the shearing action of the material in resisting the forces applied to the assembly.

These and other objects of the invention will be apparent to persons skilled in the art from a study of the following description and accompanying drawings, in which.

Referring now to the drawings in detail, it is seen that in each case the end assembly is very similar and is applied to the car side sills B which, in the instance shown, are of inverted bulb angle formation and may form the sills of a car such as illustrated in Pancake Patent No. 1,962,723. The end construction in each of the instances shown consists of a pressed end member having a horizontal floor supporting portion 2 offset upwardly and outwardly as at 4 then upwardly as at 6 to form the back wall of the end member. The upper edge of the back wall merges into the outwardly directed upper flange 8 which serves as a protecting housing for the bumper assembly as well as adding strength to the unit. The edges of the floor supporting portion are directed upwardly as at 10 to merge with the back wall 6 as clearly shown in Figures 1, 8, 12 and 15 and this upwardly directed portion is adapted to be attached to the side sill webs by any suitable means such as rivets 12. The upwardly offset portion 4 provides clearance for the attachment of a lower end construction plate 14 which stiffens the end construction and at the same time serves as a bumper supporting element. This plate may be flat as shown in Figures 8 to 14 inclusive or if a narrower bumping face is desired it may be bent in the form of a Z as clearly shown in Figures 1 to 6 and in which a vertically directed portion 16 connects the horizontally disposed portions of the plate. The bumper cap in each of the modifications is of the customary type having a vertical curved buffing face 18 and rearwardly directed upper and lower flanges 20 and 22 respectively which may overlie the outwardly directed plates of the end construction as shown in Figs. 1 to 6 or may fit between the plates as shown in Figures 8 to 15 inclusive. In order that the cars may be coupled together a substantially U-shaped member 23 is provided having its downwardly directed legs 24 welded or otherwise secured to the upper flange of the bumper. This member as well as the upper and lower flanges of the bumper are provided with aligned openings 25 adapted to receive the coupling pin (not shown) which will be permitted movement in an inward or outward direction due to the provision of elongated slots 26 formed in the upper and lower plates of the end construction.

Referring now particularly to Figures 1 to 7 inclusive, it is seen that the general construction just described need be modified but slightly to accommodate the arrangement now to be described in detail. A plurality of buffer plates 28 of suitable and varying lengths are welded or otherwise secured as at 29 to spaced portions of the inner surface of the curved buffing face 18. Each of these plates is of proper width to fit between the outwardly directed plates of the end construction and are each provided with an opening 30 adjacent the rear edge and with an elongated slot 32 at some intermediate position. The plates are so designed that the holes 30 and slots 32 will be in alignment transversely of the buffing head. It is to be noted that the two intermediate plates are positioned the proper distance apart to permit the entrance therebetween of the coupler pin previously referred to.

A plurality of end plates 34 are welded or otherwise secured as at 35 to spaced points along the vertical wall 6 and upper horizontal wall 8 of the end construction. Each of these plates is provided adjacent its inner edge with an elongated slot 36 and adjacent an intermediate point with an opening 38. It is to be noted that with the bumper in assembled position these slots 36 and openings 38 are to be in alignment transversely of the car and as shown in Figures 3 and 4 the openings 30 and 38 will be substantially in alignment with the center of the elongated slots 36 and 32 respectively.

Figure 1:
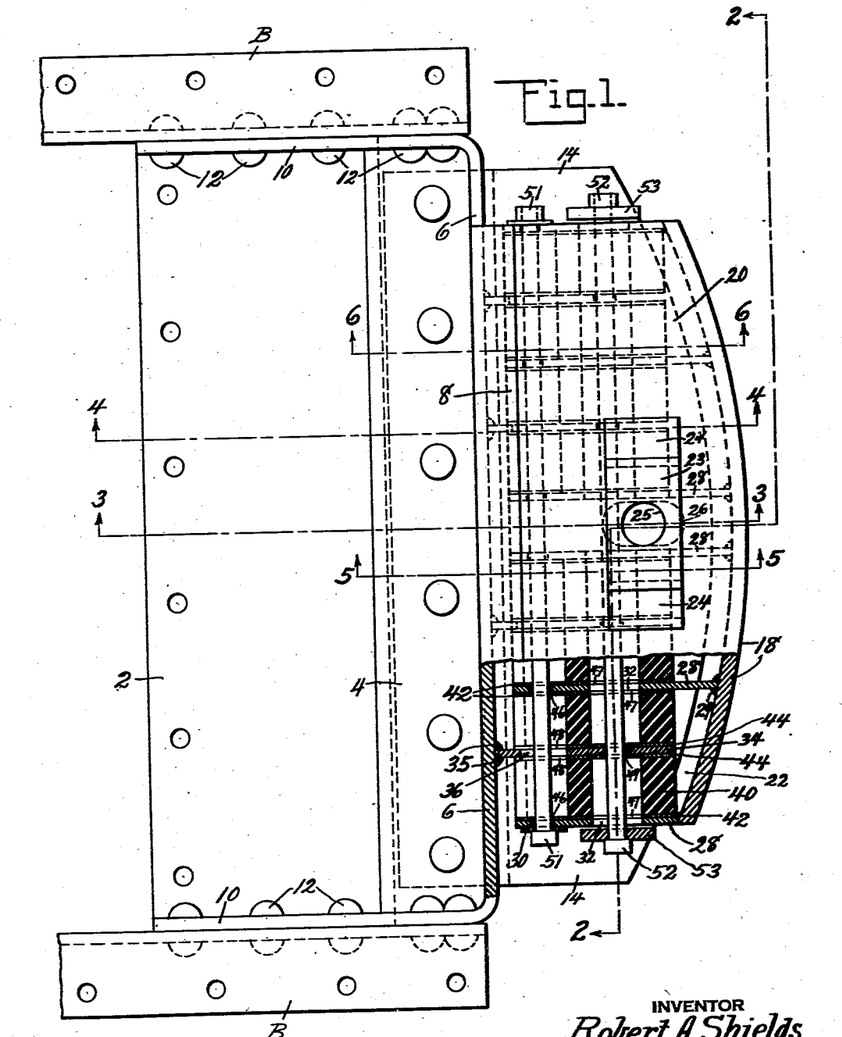
Figure 1 is a plan view of the invention taken substantially on line 1—1 of Fig. 2 and showing the relation of the non-metallic units.
Figures 2, 3, 4, 5, 6, 7:
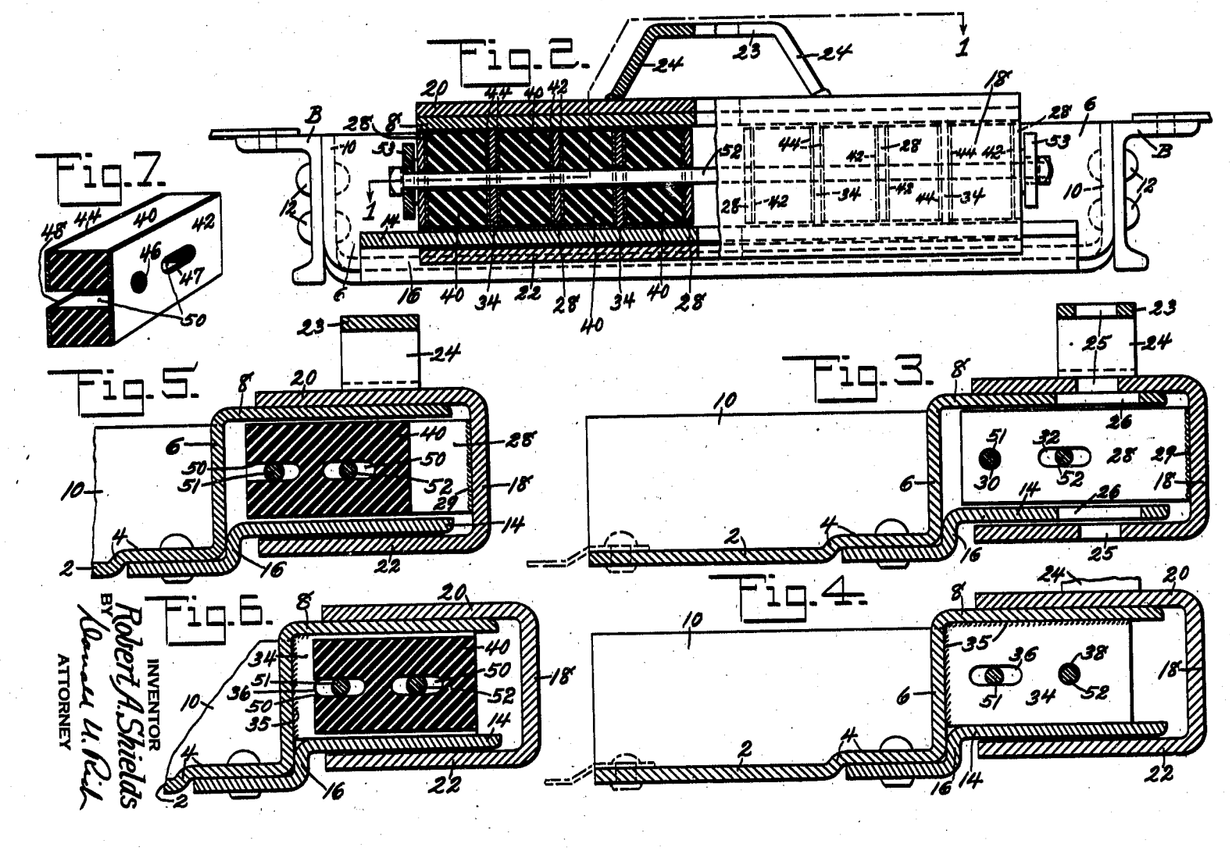
Fig. 2 is a sectional view taken substantially on line 2—2 of Fig. 1.
Fig. 3 is a sectional view taken substantially on line 3—3 of Fig. 1 and showing one of the buffer attached plates.
Fig. 4 is a sectional view taken substantially on line 4—4 of Fig. 1 and showing the plate which is secured to the end construction.
Fig. 5 is a sectional view taken substantially on line 5—5 of Fig. 1.
Fig. 6 is a sectional view taken substantially on line 6—6 of Fig. 1.
Fig. 7 is a perspective view partly in section of one of the non-metallic units.

As clearly shown in Figures 1 and 7 each of the resilient units is formed by a block of non-metallic material 40, preferably rubber, which has one face vulcanized or otherwise secured to what may be termed draft or bumper carried plate 42, while the opposite face is vulcanized or otherwise secured to what may be termed a buffing or end carried plate 44. The draft plate 42 is provided adjacent one end with an opening 46 and adjacent the other end with an elongated slot 47, while the buffing plate 44 will be of substantially identical design but with an elongated slot 48 placed opposite the hole 46 and with a hole 49 placed opposite the elongated slot 47. In order to prevent abrasion of the non-metallic material by the securing bolts, later to be referred to, the non-metallic material is provided with slots 50 of substantially the same dimensions as the slots in the draft and buffing plates. In the assembled position these resilient units of non-metallic material are positioned between the end plates 34 and buffer plates 28 and secured in their proper position by means of inner and outer through bolts 51 and 52 respectively. The inner bolt will be stationary with respect to the buffer, while the outer bolt 52 will be movable with respect to the buffer or, in other words, stationary with respect to the car and, since there will be movement between this bolt and buffer, washers 53 will be provided between the bolt ends and the end buffer plates 28. As clearly seen in Figure 1 the resilient units are placed with the draft plates 42 adjacent the buffer plates 28, while the buffer plates 44 are positioned adjacent the end plates 34. With such a construction there will be no relative movement between the unit carried plates and the buffer or end plates, since the through bolt 51 will anchor the draft plates to the buffer plates and the through bolt 52 will anchor the buffer plates to the end plates 34. It will be obvious that the units, if desired, may be turned over, that is, the draft plates 42 may be positioned adjacent the end plates 34, while the buffing plates 44 would then be positioned adjacent the buffer plates 28, thus causing relative movement between the metallic plates and affording a frictional resistance which would aid the resistance obtained through the shear action of the non-metallic material. With such a position of the non-metallic units, however, the through bolts would be subjected to bending strains instead of the pure shear strains to which they were subjected when the parts are assembled as shown in Figure 1.

The operation of the modification shown in Figures 1 to 7 and just described is as follows with the parts in the normal position illustrated in Figure 1: Upon the car striking an abutment or another car the buffing face will be moved inward carrying with it the buffer plates 28 and through bolt 51 and since the through bolt passes through holes 46 of the draft plates 42, they must of necessity also move inward with the buffer plates and bolt. The inward movement of the through bolt 51 is permitted due to the elongated slots 36 of the end plates, while the inward movement of the buffer plates 28 will be permitted due to the elongated slots 32 moving relative to the through bolt 52. Since the through bolt 52 is anchored to the car by passing through holes 38 in the end plates and through the holes 49 of the unit buffer plates, these plates will be held stationary with respect to the car at all times accordingly. With the inward movement of plates 42 with respect to the stationarily held plates 44, the non-metallic material will be placed in shear, thus resisting the inward movement of the buffing face. Upon application of the draft force the action of the various parts is identical to that just described with the exception that the buffer plates and other connected parts will move outwardly relative to the car instead of inwardly.

It is obvious that to assemble the construction it is only necessary that the non-metallic units be slid into the end construction, after which the buffing element with its attached buffer plates may be slid into position between the adjacent non-metallic units, after which the through bolts are inserted and the construction is ready for use.

In case a buffer assembly of less capacity is desired, it is only necessary that certain units be eliminated, or if a buffer of greater capacity is desired, it is only necessary that additional buffer and end plates be attached and the width of the non-metallic units decreased, which would accordingly decrease the free movement possible, provided the hardness of the material remains constant. But if the same movement is desired, it will only be necessary to decrease the hardness of the non-metallic material.

Referring now to Figures 8 to 11 inclusive, it will be seen that the general assembly previously described will be modified by attaching the leg 56 of a T-shaped element to the central portion of the wall 6 by welding as at 57. This T-element has the flanges 58 spaced inwardly from the wall 6 to provide anchoring means which will later be described. The buffing element is modified by attaching angle plates 59 and 60 to the upper and lower flanges respectively. These angle plates are so placed as to have the legs 61 directed toward each other and located in a plane spaced inwardly from the buffing face. In this modification the non-metallic units are formed of a block of non-metallic material 62 to one face of which is secured what may be termed a buffing plate 63 (Fig. 10), while to the opposite face is secured what may be termed a draft plate 64. The plate 63 is of general rectangular form but has the rear central portion thereof provided with a T-shaped slot 66 adapted to fit over the flanges of the T-shaped end member as clearly shown in Fig. 10. The upper and lower forward corners of this plate are removed as at 67 in order to clear the legs 61, thus permitting inward movement of the bumper relative to these buffer plates. The draft plates of each unit are of general rectangular form with a centrally located rectangular opening 68 bounded on the rear by short projections 69, thus forming a T-shaped slot with the projections 69 adapted to engage behind the flanges of the end carried T or anchor bar. The upper and lower forward corners of the plate are notched as at 70 in order to engage over the flanges 61 of the bumper carried angles as clearly shown in Figure 11. It is obvious from Figures 10 and 11 that each of the buffing plates 63 are substantially rigid with the end member and will also serve as a limit plate checking the inward movement of the bumper member. The unit is shown as stressed to the limit of draft in Figure 11, namely, any further pull added will be transferred directly through the plate 64 to the end T relieving the non-metallic material of strain.

To assemble this construction it is only necessary for the pre-formed resilient units to be slipped into position from the end of the bumper with the buffing plates engaging over the end T or anchor bar, while the draft plates also engage over this bar as well as the flanges 61 of the bumper element. With the units all in position anchor angles 71 may be applied to the flanges of the anchor bar or T, thus preventing any lateral displacement of the resilient units as clearly shown in Figures 8 and 9. With the construction assembled as described it is obvious that any buffing force applied to the bumping member will be permitted through flanges 61 to the draft plates 64, causing these plates to move inward relative to the end construction and anchor bar or T. Such inward movement of the draft plates will, of course, stress the non-metallic material, since the buffing plates 63 will be held against inward movement by their engagement with the anchor bar and vertical wall of the end construction. The non-metallic material cannot be stressed beyond the safe limits since further inward movement of the bumper head will be arrested when the flanges 61 strike the buffing plates 63 as will be clear from a study of Figure 10. Upon application of a draft force to the bumper member it will, of course, tend to move outward causing the flanges 61 to carry the draft plates 64 therewith and again stressing the non-metallic material since the buffing plates 63 will be held rigid with the end construction due to their engagement over the anchor bar or T. Movement of the bumper member to such a position as to overstrain the non-metallic material will be prevented due to the engagement of the stops 69 with the flanges of the end carried anchor bar as clearly shown in Figure 11.

Figure 8:
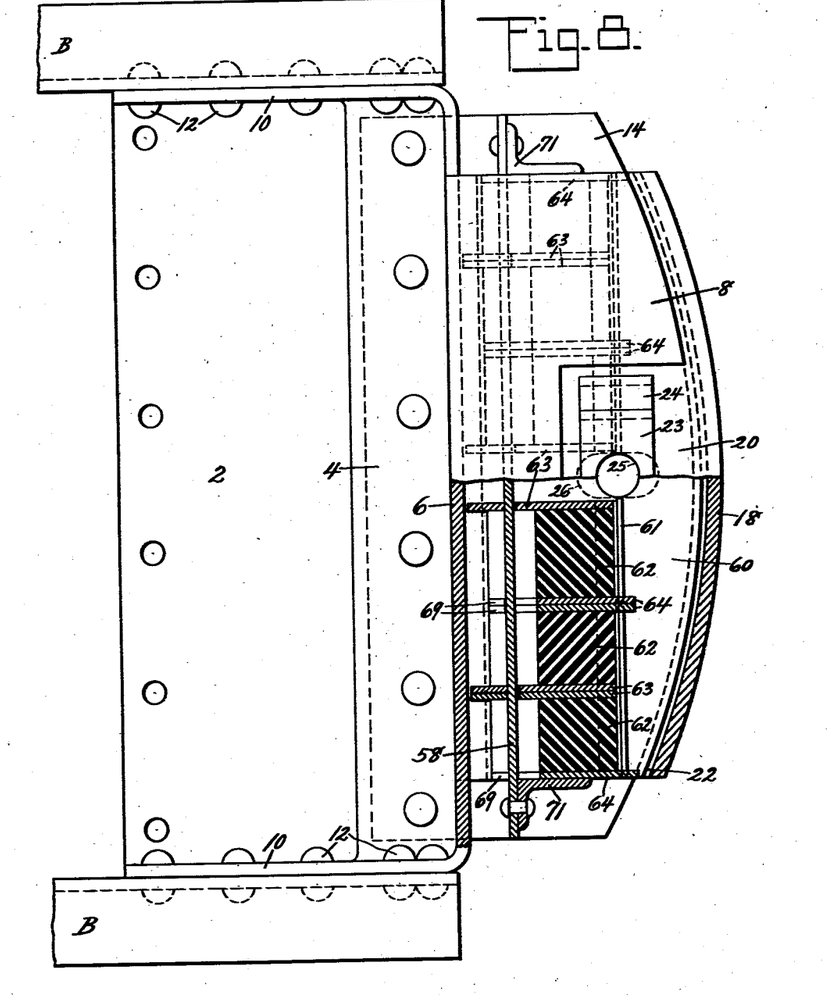
Fig. 8 is a sectional plan view taken substantially on line 8—8 of Fig. 9 and is similar to Figure 1 but showing a modification thereof.
Figures 9, 10, 11, 13, 14:
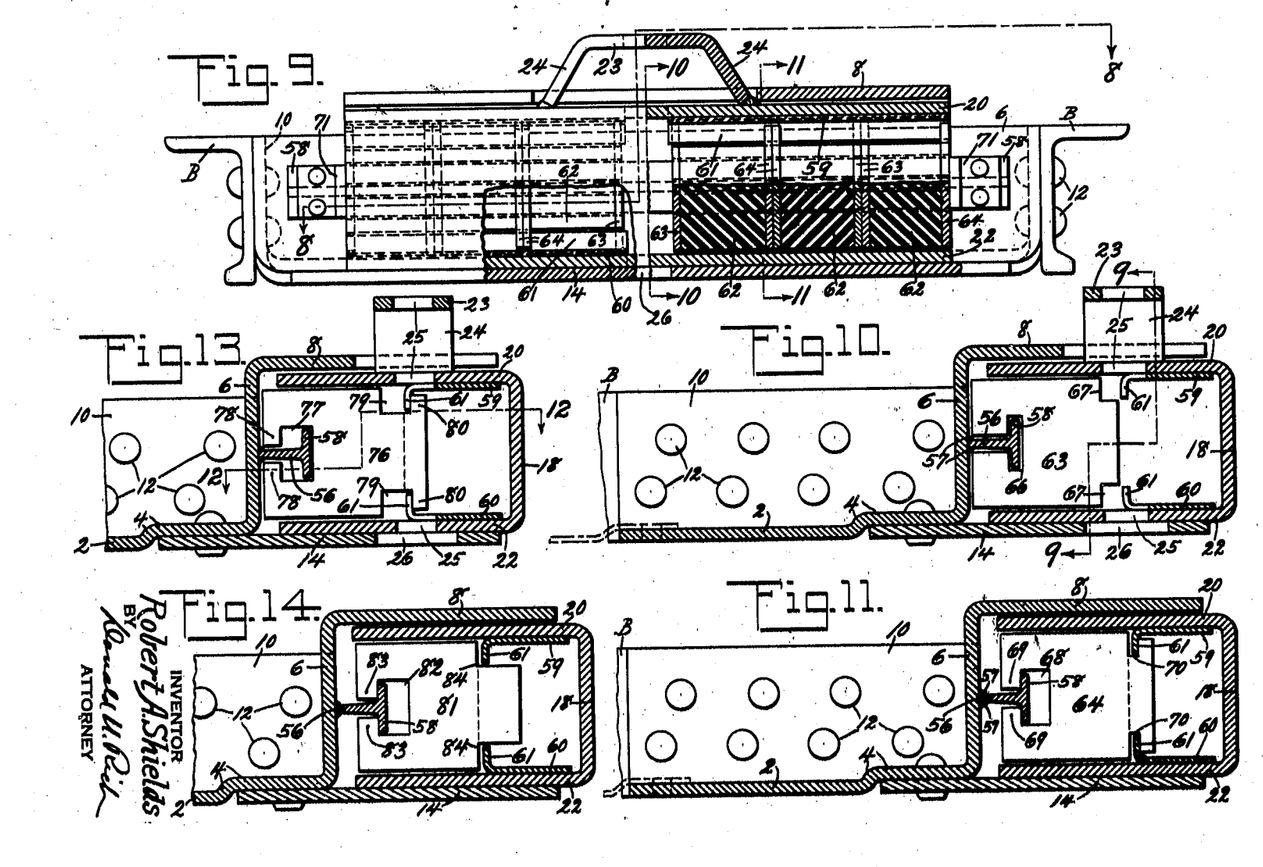
Fig. 9 is a sectional view of this modification taken substantially on line 9—9 of Fig. 10.
Fig. 10 is a sectional view taken substantially on line 10—10 of Fig. 9 and disclosing what may be termed the fixed plate of a non-metallic unit.
Fig. 11 is a sectional view taken substantially on line 11—11 of Fig. 9 and shows what may be termed the bumper connected or movable plate of a non-metallic unit.
Fig. 13 is a sectional view taken substantially on line 13—13 of Fig. 12.
Fig. 14 is a sectional view taken substantially on line 14—14 of Fig. 12.
Figure 12:
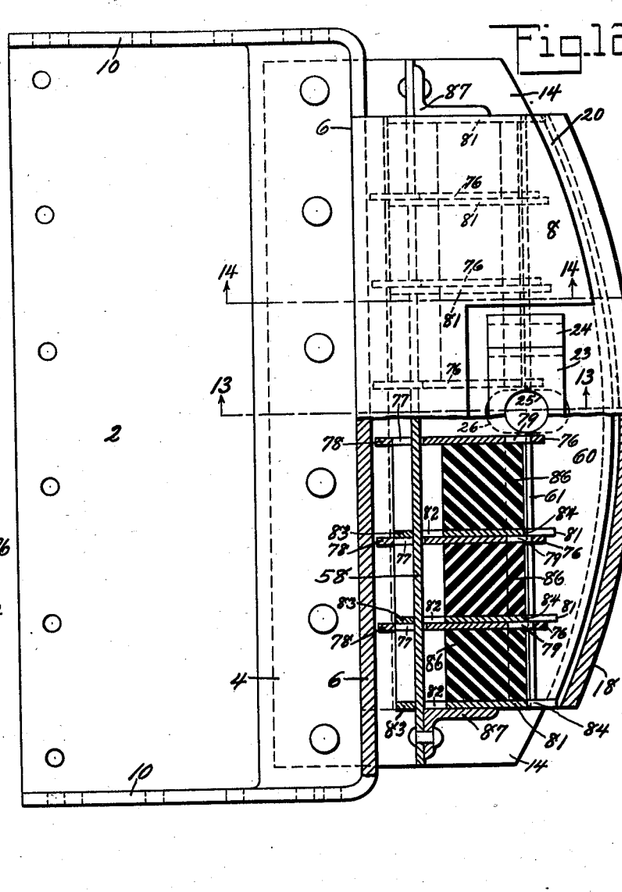
Fig. 12 is a sectional view taken substantially on line 12—12 of Fig. 13 and is similar to Figure 8 but discloses a variation thereof.

Reference will now be had to Figures 12, 13 and 14 which disclose a further modification of the arrangement just described in connection with Figures 8 to 11. In this modification the end construction and bumper elements will be formed substantially identical with that described in connection with Figure 8 and, therefore, the same reference numerals have been applied and further description is deemed unnecessary. The non-metallic units of this construction are varied and as clearly shown in Figure 13 the so-called draft plates 76 are of general rectangular formation with the rear central portion formed with a rectangular opening 77 partially open to the rear, thus providing projections 78 adapted under certain conditions to engage the vertically extended flanges of the anchor bar. The upper and lower forward corners of these draft plates are formed with an elongated slot 79 in which the bumper carried flanges 61 may move under buffing strains. The outward movement of the bumper with respect to these draft plates will be checked by the projections 80 as clearly shown in Figure 13. Each of the buffing plates 81 are also of generally rectangular formation and are formed adjacent their rear central portion with a rectangular opening 82 bounded on the rear by projections 83 adapted to engage the vertically extending flanges of the anchor bar. The upper and lower forward corners of the buffing plates are removed as at 84 in order to permit outward movement of the flanges 61 while checking inward movement thereof. It should be noted that these draft and buffing plates are of substantially identical form and may be made with the same pattern after which the projections 80 of the draft plates would be removed, thus giving the buffing plate as shown. Such a construction, of course, permits the use of a single pattern of plate. Each non-metallic unit is formed by vulcanizing or otherwise securing one draft plate and one buffing plate to opposite faces of a block of non-metallic material 86. With the units prepared it is only necessary that they be slid into position through the ends of the bumper after which the anchor angles 87 may be secured to the flanges of the anchor bar, thus preventing any lateral displacement of the units. If desired the units may be slid into position and arranged such that adjacent draft or buffing plates abut each other, that is, in the same arrangement as shown in Figure 8. In the instance shown, however, alternate units are turned over, thus causing a draft plate of one unit to abut the buffing plate of the next adjacent unit and since there will be relative movement between these plates friction will exist assisting in controlling the movements of the bumper.

The operation of this modification is as follows: Upon application of a buffing force to the bumper it will move inward causing the flanges 61 to force the buffing plates 81 inward relative to the end construction, thus stressing the non-metallic material since the draft plates will be in abutment with the end wall and anchor bar. The inward movement of the buffing plates is permitted due to the rectangular opening 82, while the inward movement of the bumper relative to the draft plates is permitted due to the elongated slot 79, all as clearly disclosed in Figures 13 and 14. Application of the draft force to the bumper will cause the flanges 61 to engage the projections 80 of the draft plates carrying them outward and again stressing the non-metallic material since the buffing plates 81 will be held against outward movement due to the engagement of projections 83 with the anchor member. Since the units are arranged alternately, friction will exist between the relatively moving draft and buffing plates and assist the non-metallic material either in resisting inner or outward movement of the bumper unit as will be clear from the preceding description and a study of Figure 12.

In each of the modifications described and disclosed in Figures 8 to 14 it is obvious that if desired the non-metallic units may be standardized and bumper capacities controlled merely by addition or removal of the proper number of non-metallic units.

Figure 15:
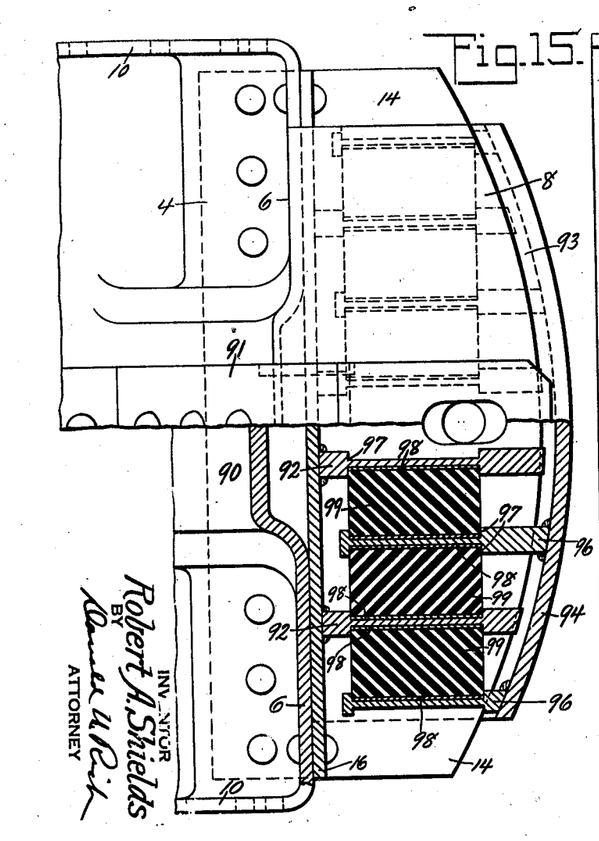
Fig 15 is a sectional plan view similar to Figure 1, but disclosing a variation thereof.

In the form shown by Figure 15 the end construction is substantially identical with those previously described with the mere exception that the central portion of the end construction has been pressed upwardly as at 90 to provide a mounting for a drawbar 91. This modification is very similar to that described in connection with Figures 1 to 7 with the exception that changes have been made in order to eliminate the use of the through bolts. As shown a plurality of end members or plates 92 of roughly H-section and of properly varying lengths are welded or otherwise secured to the top plates and end wall of the end construction in the same manner as shown in Figure 6. In this form the bumper instead of being in a final form will be very similar to that shown in Figures 1 to 6 inclusive. However, for purposes of assembly it will originally be formed with the top plate 93 and curved bumping face 94 pressed from a single sheet of material. To the forward bumping face will be welded a plurality of varying length buffing plates 96 of generally H cross section with the upper edges spaced from the top plate. It will be noted that by forming the end and buffing plates of substantially H cross section shoulders 97 will be provided, thus forming recesses adapted to receive and retain the non-metallic units against any shifting and that the recesses are substantially of equal area in order to permit use of a single size cushioning unit. The non-metallic units in this instance are formed by vulcanizing or otherwise securing metal plates 98 to opposite faces of the non-metallic blocks 99. It should be noted that some of these metal plates are carried by the bumper member while others are carried by the end structure. The above described construction will be assembled by sliding the angle form bumper over the top plate of the end construction, after which the non-metallic units are slid vertically into position and the bottom plate 14 riveted in position. If deemed necessary for added strength, the lower flange of the bumper will then be welded to the bumper face, thus completing the assembly.

The operation of the bumper shown in Figure 15 is substantially the same as that shown in Figure 1, since the buffing plates 96 will move in accordance with the bumper, while the end plates 92 will be held rigid upon the car thus any bumper movements will cause the non-metallic material of each unit to be stressed whether the movement of the bumper be inward or outward.

It will be apparent from a study of these various described forms that a combined bumper and draft element may be formed which may be readily designed to take care of various capacities or sizes of cars. Since the non-metallic units are entirely independent of each other, the thickness and number of the units used may be varied, thus varying the capacities and resiliency of the assembly. Due to the use of multiple non-metallic units, it is obvious that a far greater shear area may be obtained than would be possible in any other manner.

While the present invention has been described more or less in detail, it is obvious that various modifications and rearrangements of parts other than those mentioned will be apparent to persons skilled in the art and all such modifications and rearrangements of parts are contemplated as fall within the scope of the following claims.

What is claimed is:

1. In a bumper for mine cars the combination of, an end member, a plurality of metallic plates carried by the end member, a bumper directly supported by the end member, a plurality of metallic plates carried by the bumper, and rubber cushions bonded to the plates, each cushion being bonded to one end member carried plate and to one bumper carried plate and acting in shear to resist bumper movements, certain of said plates moving under bumper force into direct contact with the end member to check the bumper movement and thereby limit the shear action to which the rubber cushions may be subjected.

2. In a bumper for mine cars the combination of, an end member with outwardly directed flanges, a bumper member with inwardly directed flanges supported by the end member flanges, and a plurality of cushioning units for elastically connecting said bumper and end member together, said units occupying substantially the entire space between the flanges of one of said members and each comprising spaced vertically disposed plates bonded to a non-metallic material.

3. In a bumper for mine cars the combination of, an end member, a bumper supported by the end member, and a plurality of cushioning units for elastically connecting said bumper and end member together, said units each comprising spaced vertically disposed plates bonded to a non-metallic material, horizontally extending means connecting one plate of each unit to the bumper for movement outward therewith, and additional horizontally extending means connecting the other plate of each unit to the end member to prevent movement outward therefrom.

4. In a bumper for mine cars the combination of, an end member, a bumper supported by the end member, and a plurality of cushioning units for elastically connecting said bumper and end member together, said units each comprising spaced vertically disposed plates bonded to a non-metallic material, means connecting one plate of each unit to the bumper for movement outward therewith, and additional means connecting the other plate of each unit to the end member to prevent movement outward therefrom, each of said connecting means consisting in part at least of vertically extending plates.

5. In a bumper for mine cars the combination of, a flanged end member, a flanged bumper supported by the end member, a plurality of cushioning units located between certain of said flanges and elastically connecting said bumper and end member together, said units each comprising spaced vertically disposed plates bonded to a non-metallic material located substantially intermediate the flanges of the end member, T-shaped means connecting one plate of each unit to the end member to prevent movement outward therefrom, and angle shaped means between the flanges of the bumper and connecting the other plate of each unit to the bumper for movement outward therewith.

6. In a bumper for mine cars the combination of, an end member, a bumper supported by the end member, and a plurality of cushioning units for elastically connecting said bumper and end member together, said units each comprising spaced vertically disposed plates bonded to a non-metallic material, horizontally extending means connecting one plate of each unit to the bumper for movement outward therewith, and additional horizontally extending means connecting the other plate of each unit to the end member to prevent movement outward therefrom, each plate of each unit being slotted to permit movement thereof relative to at least one of the said horizontal means.

7. In a bumper for mine cars the combination of, an end member, a bumper supported by the end member, and a plurality of cushioning units for elastically connecting said bumper and end member together, said units each comprising spaced vertically disposed plates bonded to a non-metallic material, T-shaped means connecting one plate of each unit to the end member to prevent movement outward therefrom, and angle shaped means connecting the other plate of each unit to the bumper for movement outward therewith, said units being positioned so that the end member carried plates and bumper carried plates respectively of adjacent units abut each other whereby only the shear of the non-metallic material will resist movements of the bumper.

8. In a bumper for mine cars the combination of, an end member, a bumper supported by the end member, and a plurality of cushioning units for elastically connecting said bumper and end member together, said units each comprising spaced vertically disposed plates bonded to a non-metallic material, T-shaped means connecting one plate of each unit to the end member to prevent movement outward therefrom, and angle shaped means connecting the other plate of each unit to the bumper for movement outward therewith, said units being alternately positioned so that the end member carried plates of one unit abut the bumper carried plates of the adjacent unit whereby the friction between plates will assist the shear of the non-metallic material to resist movements of the bumper.

9. In a bumper for mine cars the combination of, an end member, a bumper supported by the end member, and a plurality of cushioning units for elastically connecting said bumper and end member together, said units each comprising spaced vertically disposed plates bonded to a non-metallic material, T-shaped means connecting one plate of each unit to the end member to prevent movement outward therefrom, and angle shaped means connecting the other plate of each unit to the bumper for movement outward therewith, said means and units being so formed as to permit lateral insertion of the units into their connecting position.

10. In a bumper for mine cars the combination of, an end member, a bumper supported by the end member, vertically extending means rigidly secured to the bumper, additional vertically extending means rigidly secured to the end member and positioned intermediate said first named means, and a plurality of cushioning units for elastically connecting said bumper and end member together, each of the units comprising spaced vertically disposed plates bonded to a non-metallic material and each of said plates being connected to at least one of said vertically extending means.

11. In a bumper for mine cars the combination of, a flanged end member, a flanged bumper supported by an end member flange, means rigidly secured to the bumper and located between the flanges thereof, additional means rigidly secured to the end member, and a plurality of cushioning units for elastically connecting said bumper and end member together, each of the units comprising spaced vertically disposed plates bonded to a non-metallic material, said plates and means being so arranged as to permit sliding of the units into engagement with said means.

12. In a bumper for mine cars the combination of an end member having outwardly directed flanges, a bumper member having inwardly directed flanges supported by the end member flanges, a plurality of cushioning units for elastically connecting said bumper and end member together, said units occupying substantially the entire vertical space between the flanges of one of said members and each comprising spaced vertically disposed plates bonded to a non-metallic material and means connecting said vertically disposed unit plates to said bumper and end member, said connecting means consisting in part at least of vertically extending plates welded to said end member.

13. In a bumper for mine cars the combination of an end member, a bumper member supported by the end member, and a plurality of cushioning units for elastically connecting said bumper member and end member together, said units each comprising spaced vertically disposed plates bonded to a non-metallic material, means connecting one plate of each unit to the bumper member for movement outward therewith, and additional means connecting the other plate of each unit to the end member to prevent movement outward therefrom, each of said connecting means consisting solely of vertically extending plates welded to the member with which it is associated.

14. In a bumper for mine cars the combination of, an end member, a flanged bumper member supported on one of the end member flanges, means rigidly secured to the bumper member, additional means rigidly secured to the end member, and a plurality of cushioning units for elastically connecting said bumper and end member together, each of the units comprising spaced plates bonded to a non-metallic material and having the planes of the plates disposed in substantially vertical planes, each of said plates being connected to at least one of said means and transversely displaceable therealong relative to the adjacent member, and retaining means carried solely by one of said members and preventing displacement of the units.

15. In a bumper for mine cars the combination of an end member, a plurality of metallic plates carried by the end member with substantially half of the plates welded to the end member and the remaining plates being free of permanent connection thereto, a bumper supported by the end member, a plurality of metallic plates carried by the bumper with substantially half of the plates welded to the bumper and the remaining plates being free of permanent connection thereto, and rubber cushions bonded to said remaining plates, each cushion being bonded to one end member carried free plate and to one bumper carried free plate and acting in shear to resist bumper movements, certain of said plates cooperating directly with the end member to check the bumper movements and thereby limit the shear action to which the rubber cushions may be subjected.

16. In a bumper for mine cars the combination of, an end member, a bumper member supported by the end member, a plurality of cushioning units for elastically connecting said bumper member, and end member together, and means connected to said member and connecting together said units and member, said units each comprising spaced plates bonded to a non-metallic material and having the planes of the plates disposed in substantially vertical planes, one of said plates being connected by said means to the end member to prevent movement outward therefrom and the other to the bumper for movement outward therewith whereby said material will act in shear to resist bumper movements, said units and means being so formed and arranged as to permit the sliding of said units transversely of the bumper while in a position connecting said bumper and end member.

17. In a bumper for mine cars the combination of, an end member, a flanged bumper supported by the end, and a plurality of cushioning units for elastically connecting said bumper and end member together, said units each comprising, spaced plates bonded to a non-metallic material and having the planes of the plates disposed in substantially vertical planes, means connecting one plate of each unit to the bumper for transverse sliding movement relative thereto and for movement outward therewith, and additional means secured to the end member intermediate the flanges thereof and connecting the other plate of each unit to the end member for transverse sliding movements relative thereto and to prevent outward movement therefrom.

ROBERT A. SHIELDS.